United States Patent
Grafe et al.

(10) Patent No.: US 7,827,891 B1
(45) Date of Patent: Nov. 9, 2010

(54) DEVICE FOR CUTTING A WORK PIECE IN A TRANSPORT LINE

(75) Inventors: Horst Grafe, Hilchenbach (DE); Barbara Ladda-Zunk, Hilchenbach (DE); Max Münker, Olpe (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 0 days.

(21) Appl. No.: 09/744,484

(22) PCT Filed: Jul. 17, 1999

(86) PCT No.: PCT/EP99/05115
§ 371 (c)(1), (2), (4) Date: May 21, 2001

(87) PCT Pub. No.: WO00/05019
PCT Pub. Date: Feb. 3, 2000

(30) Foreign Application Priority Data

Jul. 24, 1998 (DE) ................................ 198 33 324

(51) Int. Cl.
*B23D 25/02* (2006.01)
*B26D 5/02* (2006.01)

(52) U.S. Cl. .................. 83/343; 83/559; 83/560; 83/563

(58) Field of Classification Search .............. 83/563, 83/564, 559, 560, 343, 344, 345, 157, 153, 83/479
See application file for complete search history.

(56) References Cited

U.S. PATENT DOCUMENTS

| | | | | |
|---|---|---|---|---|
| 3,408,886 A | * | 11/1968 | David .................. | 83/157 |
| 3,503,293 A | * | 3/1970 | Sander ................ | 83/564 |
| 3,561,311 A | * | 2/1971 | Nowak et al. ......... | 83/563 |
| 3,638,523 A | * | 2/1972 | Yasuda et al. ........ | 83/563 |
| 3,727,503 A | * | 4/1973 | Braner et al. ........ | 83/479 |
| RE27,918 E | * | 2/1974 | Montguire ............ | 83/479 |
| 3,895,549 A | * | 7/1975 | Noda et al. .......... | 83/345 |
| 4,183,273 A | * | 1/1980 | Greinke et al. ....... | 83/479 |
| 4,212,218 A | * | 7/1980 | Braner et al. ........ | 83/479 |
| 4,226,151 A | * | 10/1980 | Littley et al. ....... | 83/479 |

(Continued)

FOREIGN PATENT DOCUMENTS

DE 1436909 * 4/1969

(Continued)

*Primary Examiner*—Jason Daniel Prone
(74) *Attorney, Agent, or Firm*—Lucas & Mercanti, LLP; Klaus P. Stoffel (57) ABSTRACT

A shears device including a rolling table, a rail-guided drive carriage coupled with the rolling table, a U-shaped frame mounted on the drive carriage, and a drive apparatus arranged on the drive carriage for driving the shears. The frame has a first side adjacent the drive apparatus and a second side opposite the first side on which holding elements for the shears are provided. At least one of the holding elements on the second side of an upper of the horizontal arms includes a pressure plate. A drive is provided for moving the drive carriage transverse to the transport line. A clamping element is arranged at the second side of the frame and has congruent gliding plates that overlap the pressure plate. The clamping element together with the gliding plates is movable along a horizontal path across the pressure plate to couple the clamping element and the holding element.

4 Claims, 6 Drawing Sheets

U.S. PATENT DOCUMENTS

| | | | |
|---|---|---|---|
| 4,327,620 A * | 5/1982 | Greinke et al. | 83/479 |
| 4,346,635 A * | 8/1982 | Krauss et al. | 83/479 |
| 4,470,331 A * | 9/1984 | Eiting et al. | 83/343 |
| 4,507,994 A * | 4/1985 | Meurer | 83/345 |
| 4,515,052 A * | 5/1985 | Flaum | 83/479 |
| 4,608,895 A * | 9/1986 | Bell et al. | 83/345 |
| 4,922,778 A * | 5/1990 | Nagai | 83/344 |
| 5,158,002 A * | 10/1992 | Matsunaga et al. | 83/479 |
| 5,363,731 A * | 11/1994 | Grafe | 83/436.3 |
| 5,673,603 A * | 10/1997 | Aichele | 83/346 |
| 5,860,345 A * | 1/1999 | Slabowski | 83/552 |
| 6,026,722 A * | 2/2000 | Lopez Ascaso et al. | 83/343 |
| 6,295,909 B1 * | 10/2001 | Schofield et al. | 83/344 |
| 6,370,998 B1 * | 4/2002 | Yokoro et al. | 83/344 |
| 6,637,997 B2 * | 10/2003 | Ahrns et al. | 83/479 |
| 2001/0020407 A1 * | 9/2001 | Grafe et al. | 83/344 |
| 2005/0103173 A1 * | 5/2005 | Elkis et al. | 83/563 |
| 2006/0101964 A1 * | 5/2006 | Serrra Obiol | 83/343 |

FOREIGN PATENT DOCUMENTS

| | | |
|---|---|---|
| DE | 1427899 | 2/1971 |
| DE | 4336626 | 5/1995 |
| EP | 1151819 A1 * | 11/2001 |
| JP | 01109016 A * | 4/1989 |
| WO | WO 00/05019 A2 * | 2/2000 |

* cited by examiner

DEVICE FOR CUTTING A WORK PIECE IN A TRANSPORT LINE

BACKGROUND OF THE INVENTION

The invention relates to a method for exchanging shears of a shears device used for cutting strips or sheet metal to length in a rolling or transport line, in particular, on a rolling table, which device has blade holders, one being positioned above and one being positioned below the strip, which blade holders are guided by means of holding elements. The invention also relates to a device for performing the method.

Stationary or flying shears are known which can be moved in and out of the rolling line or rolling table but only when the rolling table is not occupied in the area of the shears or other separating device by the strips or sheet metal to be cut.

Shears which are permanently and fixedly arranged in the rolling or transport line are in many cases considered an obstruction because they cover a portion of the rolling table and thus make a control action in this area more difficult. Also, the shears positioned in the rolling or transport line can present a hindrance to the running of the strip when introducing the leading edge of the strip. However, they may also represent a disturbance factor during further running of the strip, in particular, when inspections or maintenance work has to be performed on the shears or the area of the rolling table covered by the shears. Overall, with shears positioned stationary in the area of the rolling or transport line the accessibility of a rolling table area is impaired and, possibly, the running of the strip is disturbed.

U.S. Pat. No. 3,561,311 describes a shearing device with a pair of hollow shafts for receiving axially movable rods with a cutting blade attached thereto that can be positioned within a blade drum rotatable with the hollow shaft. Usually, the blades are secured in a locking position. When the rods are moved by a selective displacement, the blades are moved toward each other to carry out a cutting or shearing action for rolled material passing between the blade drums. After each cut, the shearing blades are retracted into a rest position by brake means in order to prevent continued movement of the blades.

U.S. Pat. No. 3,638,523 shows a shearing machine with interchangeable blade-holders wherein the blade holder can be laterally removed together with the blades from the machine. The movable and the stationary blade holders have adjustment wedges such that each wedge within the blade holder can independently adjust clearance at the blade holder slide guide and the clearance between the moveable and the stationary blades. In this way, an adjustment operation of the clearances after mounting of the blade holder is eliminated.

U.S. Pat. No. 3,895,549 discloses a method and device for cutting the leading and trailing ends of steel strip by means of two pairs of blades. The blades are mounted on the periphery of two drums. Each drum has a blade for the leading end and a blade for the trailing end. The blades are positioned such that the blade for the front end cut is positioned not more than 180 degrees behind the blade for the trailing end cut. The rollers are rotated in different directions in order to be able to cut each end of the strip. As a result of this method, the ends of the strip can be improved significantly in order to achieve proper passing of the strip through the hot finishing rolling device. Also, the shearing device requires less energy.

U.S. Pat. No. 4,470,331 discloses a scroll-type slitting machine having upper and lower arbors, each having a plurality of mating rotary cutting members. A movable housing rotatably supports first ends of the upper and lower arbors. A fixed housing rotatably supports opposite ends of the upper and lower arbors. A mechanism for vertically adjusting the arbors relative to the other is provided. A pinion stand is mounted external and adjacent to one of the housings. Upper and lower intermeshing, synchronizing gears are rotatably mounted within the pinion stand. Upper and lower torque-transmitting couplings extend between and operatively join the upper and lower synchronizing gears to the upper and lower arbors, respectively. They permit relative movement between the arbors.

U.S. Pat. No. 4,507,994 describes a device for monitoring the tractive force generated by a cylinder-piston assembly on a member to be moved thereby. The device has a spring that is mounted between the cylinder assembly and the member to be moved such that the force generated by the cylinder-piston assembly is transmitted to the spring for moving a first portion relative to a second portion thereof. An actuatable switch has a first switching element mounted for movement with the first portion of the spring and a second switching element fixedly mounted to the second portion of the spring. The two switching elements actuate the switch when a predetermined path of travel of the first portion of the spring is exceeded.

U.S. Pat. No. 4,608,895 discloses a pair of rotary dies with lands having coacting cutting edges which cut blanks of material from a web passing between the rotating dies. To provide a clean cut and improved squareness of the cut ends, a side face of the land adjacent the cutting edge has a positive rake. To ensure that the cutting edges can be brought into coacting relationship to produce a clean cut, they are located and arranged on the dies so that they can be varied and adjusted axially and in rotary phase relative to each other. A die stand for positioning, adjusting and driving the rotary dies is provided. A method for making negative electrode cylinders for producing the rotary dies by hardening, grinding and electric discharge machining blank cylinders of tool steel, is also disclosed.

U.S. Pat. No. 4,922,778 describes an apparatus for cutting metal sheet wherein a pair of hollow shafts are mounted in a housing for angular movement relative thereto. The hollow shafts have hollow bores whose axes are eccentric to the axes of the hollow shafts, respectively. A pair of holder shafts are rotatably fitted in the hollow bores, respectively. A pair of circular cutting blades are concentrically mounted on projecting forward ends of the holder shafts, respectively, for rotation with the hollow shafts. When the holder shafts are rotated to rotate the cutter blades, the cutter blades cooperate with each other to cut a metal sheet passing between the cutter blades.

U.S. Pat. No. 5,363,731 describes an apparatus for regulating and adjusting powered rolls for conveying metal plates supported in tubular crossbeams that is always reliable in operation and provided with a simple configuration protection from rust deposits. The apparatus is suitable especially for shears for edge trimming and/or for longitudinal or transverse division of the plates. The apparatus has regulation elements as wedges which are displaceably arranged within a bearing bracket and are in operational connection with the adjustment elements.

U.S. Pat. No. 5,673,603 shows a device for cutting to shape advancing material webs made of fibrous materials. The device has a rotatingly driven shape cutting roller and a rotatingly driven counter cutting roller. The shape cutting roller has a shape cutting edge and the counter cutting roller a smooth cylinder surface. Both rollers are mounted in a machine frame by means of pivot bearings, and the distance between the axes of the rollers is adjustable. One of these machine frame parts is held on an adjustable wedge-shaped guide for adjusting the distance between the axes of the rollers.

U.S. Pat. No. 6,026,722 discloses a device for cutting electric battery plates and has two rollers, between which a metal strip passes. The metal strip has a row of holes running down the center, separated by bridges. The lower roller is provided with means for removing cut-away pieces. A disk is mounted on the lower roller. Lugs project radially from the disk to pull the strip along. Cutter plates are mounted on the upper roller. The cutter plates are provided with blades that cut the strip and the bridges transversely to yield plates with their respective tabs. Inserts are provided under the cutter plates.

U.S. 2001/0020407 A1 describes a high-speed shearing arrangement for transversely cutting rolled strip with knife carriers that can be driven in rotation and are arranged in pairs opposite each other. The knife carriers are arranged with a fixed distance between them on both sides of the strip in a common shear cassette. The shear cassette is mounted within an outer frame and is provided with a lifting device for raising or lowering it within the outer frame. In a method for operating the shearing arrangement, the two knife carriers are moved into a horizontal position for allowing the strip end to enter or travel through, and the shear cassette is moved within the outer frame into a raised transfer position.

U.S. Pat. No. 6,295,909 discloses an apparatus for cutting metal sheet having two rotatable drums, wherein the metal sheet passes between the drums for cutting. Each of the drums has a cutting blade moved into and out of cutting position by an axial actuator rod. The cutting blade has two sets of rollers bearing against one of a pair of profiled side surfaces of the axial actuator rod.

U.S. Pat. No. 6,370,998 discloses upper and lower rotating drums having shearing blades that are supported by a bearing frame via eccentric sleeves. Only the upper rotating drum is rotated by a drive motor, while the eccentric sleeves are rotated by a drive motor, so that the rotating drums can approach one another and move away from each other. Interlocking gears are fixed to shaft end portions of the rotating drums to permit interlocking of the rotating drums when these drums approach. Oldham's couplings are interposed between the interlocking gears and timing gears to rotate the rotating drums constantly and synchronously.

German patent document 1 436 909 describes a machine for cutting, upsetting or similar processing steps of web material sheet material, in particular, for use in connection with corrugated cardboard where the material is supplied continuously to the processing tools. The machine is provided with at least two different adjustable sets of rotating tools, such as cutting or upsetting tools, and with a device provided with a pressure medium cylinder which moves the first tool set into a working position and the other into a rest position, respectively. The tool sets, before they reach their working position, are already rotated at the desired rotational speed.

SUMMARY OF THE INVENTION

It is an object of the invention to provide a method and a device for cutting strips or sheet metal to length in the rolling line, in particular, on a rolling table, by employing shears held in blade holders, one positioned above and one positioned below the strip, wherein the blade holders are guided by holding elements by which the aforementioned disadvantages and difficulties can be advantageously overcome.

In a method of the aforementioned kind, the object is solved in that the shears can be moved, together with the blade holders and with their holding elements, out of the rolling line after each cut, to the side into a neutral waiting position, while the strip or sheet metal is in the rolling or transport line. Before moving out the shears, the forward connection between the blade holders or between the holding elements overlapping the rolling line is opened. The shears, for a subsequent cut, are moved into the rolling line so as to overlap the line in a U-shape. The forward connection is closed and, by employing a clamping element, is coupled positively and non-positively before a subsequent cut. When moving the shears into the rolling or transport line, a part of the rolling table is moved out of the rolling or transport line to the side and, simultaneously with moving the shears out of the rolling or transport line into the waiting position, the part of the rolling table is again moved into the rolling table.

Accordingly, while the strip or sheet metal is positioned in the rolling or transport line, the shears, together with the blade holders and with their holding elements, are moved after each cut out of the rolling line to the side into a neutral waiting position and, before moving out the shears, the forward connection between the blade holders or between the holding elements overlapping the rolling line is opened. For a subsequent cut, the shears are moved into the rolling line so as to overlap it in a U-shaped fashion, and the forward connection of the shears is closed and positively and non-positively coupled by using a clamping element before the subsequent cut.

The method according to the invention provides in an advantageous manner the possibility to arrange the shears between the roll stand and the winding hasp, wherein the shears can be moved for the cutting action across the strip and can subsequently be removed. The shears can be pushed with the open side across the strip. Subsequently, the open side, after it has reached a position external to the strip width, can be positively connected for the purpose of receiving the shearing forces.

When the leading edge of the strip passes through, the shears are not in the transport line and therefore do not interrupt the running of the strip. Instead of the shears, a rolling table part, moveable in and out, is positioned in the line.

The open shears are only moved into the line directly before the cut. Otherwise, the rolling table remains open in the upward direction and, despite the arrangement of the shears, is still freely accessible.

One embodiment of the invention proposes that, when moving the shears into the rolling or transport line, a part of the rolling table is moved laterally out of the rolling or transport line and, simultaneously with moving the shears out of the rolling or transport line into the waiting position, the moved-out part of the rolling table is again moved into the rolling table.

A device for cutting strips or sheet metal to length in the rolling or transport line, in particular, on a rolling table, by means of shears, for performing the method according to the invention proposes that the shears, including the drive apparatus that drives the shears, are arranged on a rail-guided driving carriage which is movable by means of a drive transverse to the rolling or transport line when the strip or sheet metal is positioned in the rolling or transport line.

In one embodiment of the invention the shears are mounted in a U-shaped frame open toward the rolling or transport line and closed at the side facing the drive apparatus. Holding elements, with bearings for the blade holders, are provided at the drive side as well as the rolling table side of the frame.

As a result of the U-shaped open configuration, the shears can be moved without problems into the rolling line so as to overlap the rolling table. When moving the shears in or out, the upper blade holder and the lower blade holder of the shears are positioned so as to freely project above and below the strip or the sheet metal, respectively.

Further advantageous embodiments of the invention are provided according to the dependent claims.

BRIEF DESCRIPTION OF THE DRAWINGS

Details, features, and advantages of the invention result from the subsequent explanation of an embodiment schematically illustrated in the drawings. It is shown in.

DESCRIPTION OF PREFERRED EMBODIMENTS

Figure 1:
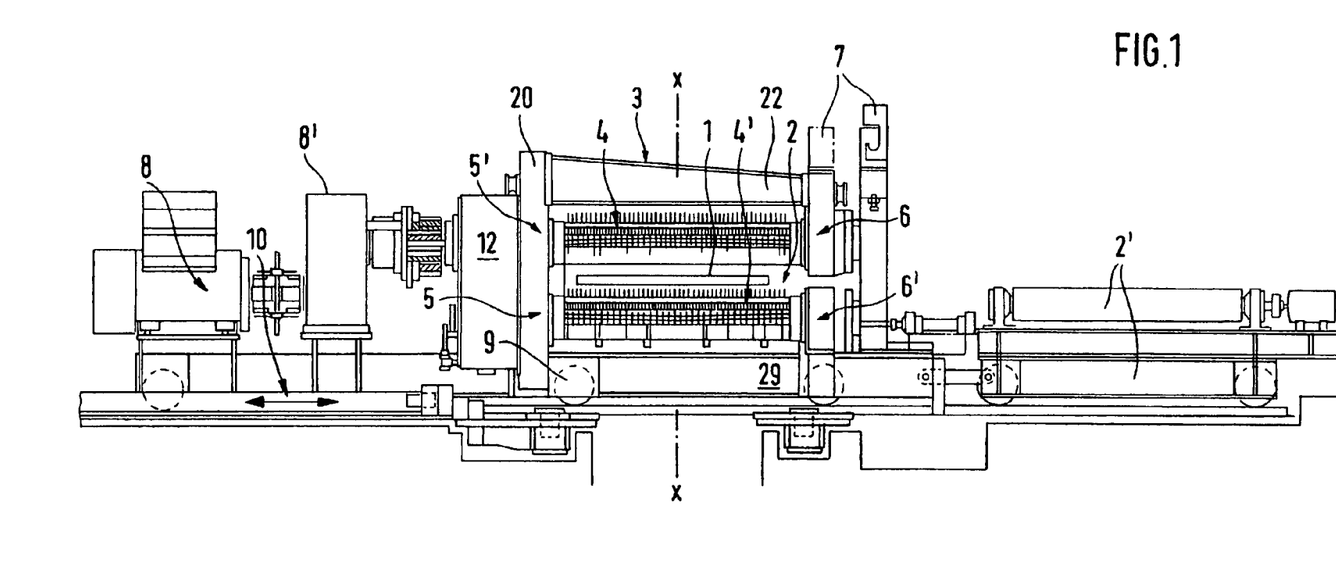
FIG. 1 is a side view of the shears embodied according to the invention on a rail-guided driving carriage coupled to the moveable part of the rolling table.

The device illustrated in FIG. 1 for cutting strips 1 or sheet metal to length in the rolling line x-x, in particular, on a rolling table 2, shows the shears 3 in a position shortly before performing a cut, with horizontal arms 22, 29 of a machine frame 20 on which the shears 3 are mounted still open. The shears 3 are connected to a drive apparatus 8 with a reducing gear 8' as well as a synchronization gear 12 flanged onto the frame 20. The drive apparatus 8 drives the shears 3. The frame 20 and the shears 3, inclusive of the drive apparatus, are mounted on a drive carriage 9 that is movable by means of a drive 10 on rails transverse to the rolling or transport line x-x. The drive carriage 9 is coupled with a movable part 2' of the rolling table 2 and is moved together with the frame 20 and the shears 3 such that the drive carriage 9 is positioned external to the rolling line x-x when the shears 3, as illustrated in FIG. 1, are positioned in the rolling line x-x and, conversely, is rejoined again with the rolling table 2 when the shears 3 are moved out of the rolling line.

As also illustrated in the figures, at the rolling table side of the frame 20 and the arms 22, 29, at least one clamping element 7 with actuating members 11, 25, 25', 30, 36, 36' is arranged. The actuating members in the present embodiment are hydraulic piston-cylinder units and are referred to as force means. On the rolling table side of the frame arms 22, 29, the holding elements 6, 6' overlapping the rolling line x-x are provided which receive bearings (not illustrated) for oppositely rotatable rotors of the blade holders 4, 4'. The transport plane of the rolling table 2 is identified by y-y.

In the drive side area of the machine frame 20, identical holding elements 5, 5' are provided which receive the drive side bearings of the blade holders 4, 4'.

The U-shaped open side of the machine frame 20 has correlated therewith the clamping element 7 for coupling the holding elements 6, 6' at the rolling table side. According to the illustration in FIGS. 2 and 3, this clamping element 7 is configured for a positive and non-positive connection of the holding elements 6, 6'.

Figure 2:
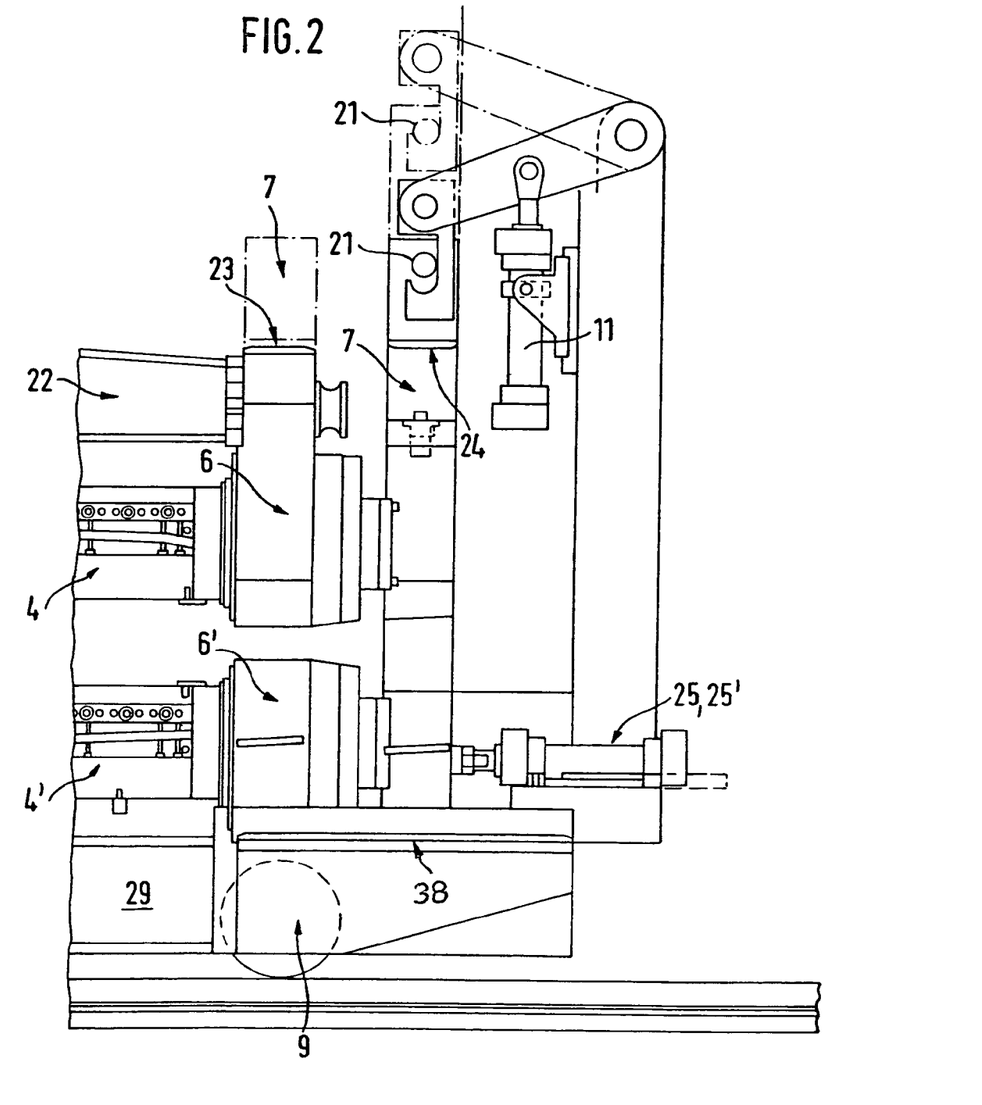
FIG. 2 is side view the upper part of the shears with the clamping element moved out.
Figure 3:
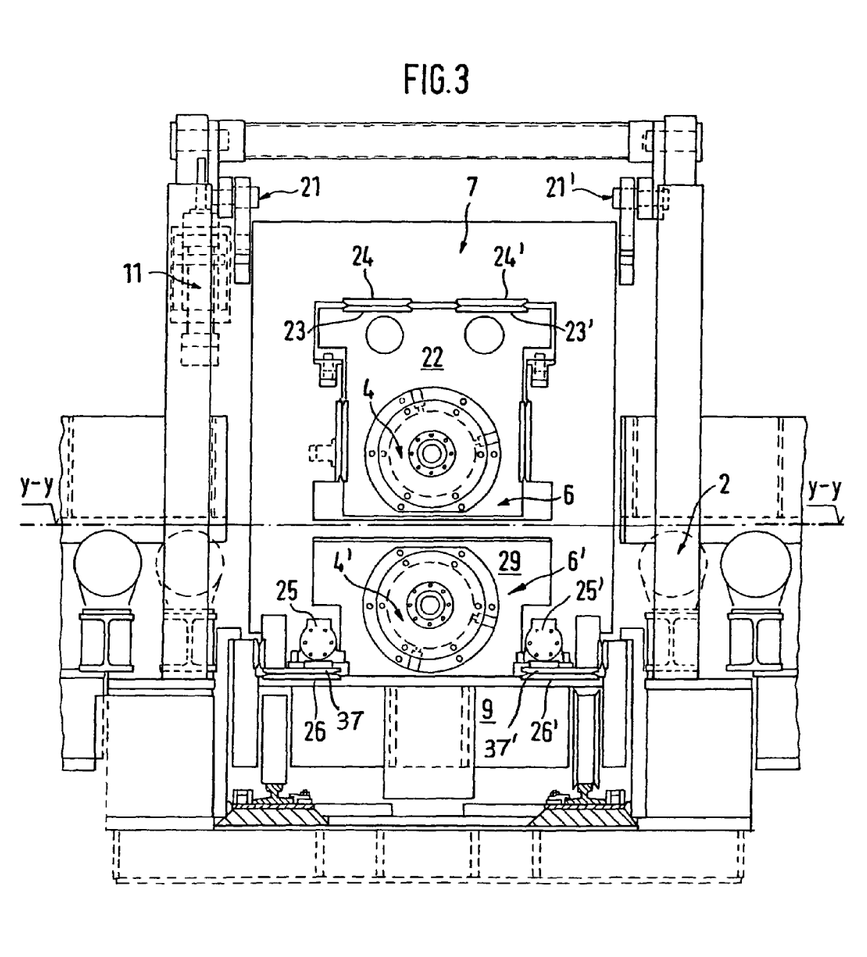
FIG. 3 is a front view the shears positioned on the driving carriage with the front-side clamping element according to FIG. 2.

According to FIG. 2 and FIG. 3, a hydraulic force means 11 cooperating with coupling elements 21 and 21' is provided for lifting the clamping element 7 into or out of the gliding path 38. Moreover, FIGS. 2 and 3 show that the holding element 6 has two pressure plates 23, 23' at the free end of the upper, horizontal frame arm 22, that the clamping element 7 has congruent gliding plates 24, 24', that the holding element 6' has two pressure plates 37, 37', and that the clamping element 7 has congruent gliding plates 26, 26'. The clamping element 7 is slidable by force means 25, 25' on a horizontal gliding path 38 with its gliding plates 24, 24' and 26, 26' across the pressure plates 23, 23' and 37, 37' for generating a positive and non-positive coupling.

Figure 4:
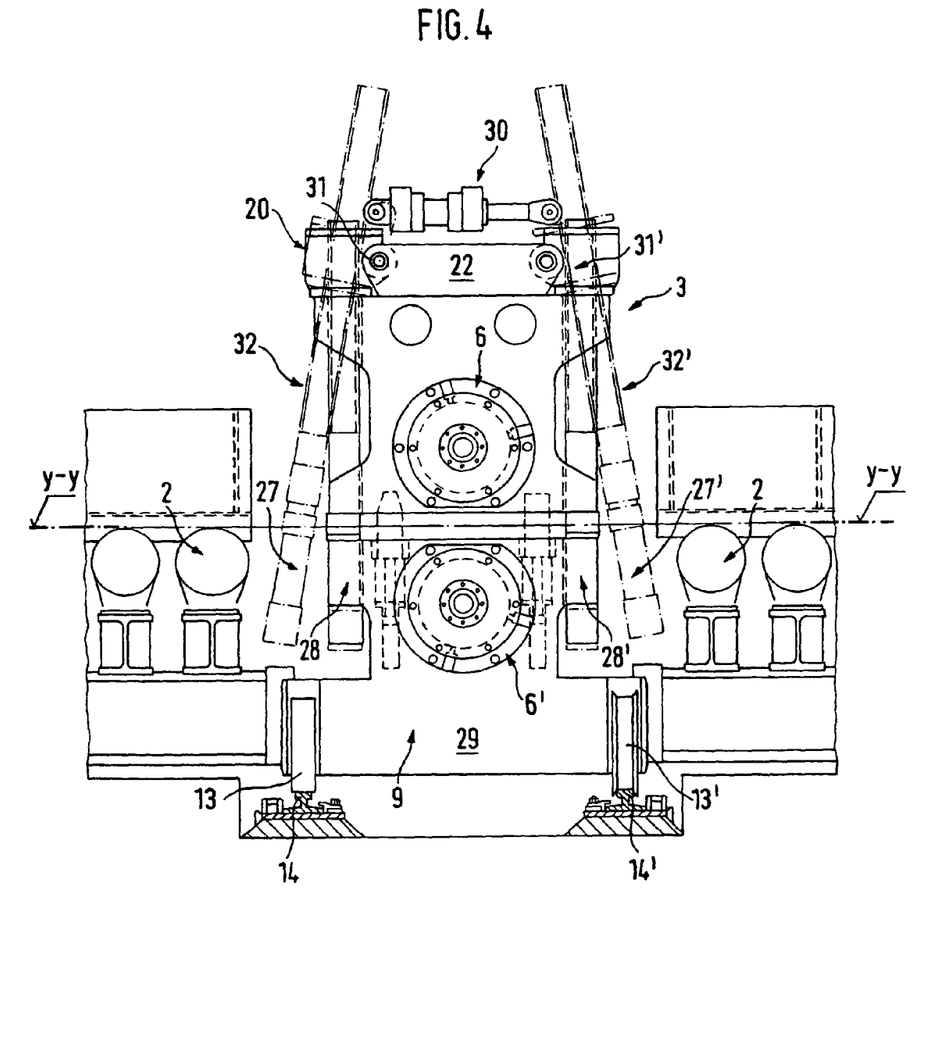
FIG. 4 is a front view the shears device with coupling rods for the coupling of the machine frame.

In FIG. 4, an alternative embodiment of the coupling device between the upper frame arm 22 and the lower frame arm 29 of the machine frame 20 is illustrated. In this embodiment, the securing element 6 is arranged at the free end of the upper horizontal frame arm 22 and has coupling rods 32, 32' with spindle drive 31, 31'. The coupling rods are connected to be pivotal to both sides.

The coupling rods 32, 32' are adjustable by force means 30, and can be engaged via lower recesses 27, 27' by congruent coupling sockets 28, 28' of the lower frame arm 29 of the machine frame 20. The coupling rods 32, 32' are moved with the aid of their spindle drives 31, 31' into the position in which the recesses 27, 27'rest in the coupling sockets 28, 28' and form a positive and non-positive connection.

In addition, FIG. 4 shows in an illustrative way the configuration of the drive carriage 9 with wheel flanges 13, 13' on the guide rails 14, 14'.

Figure 5:
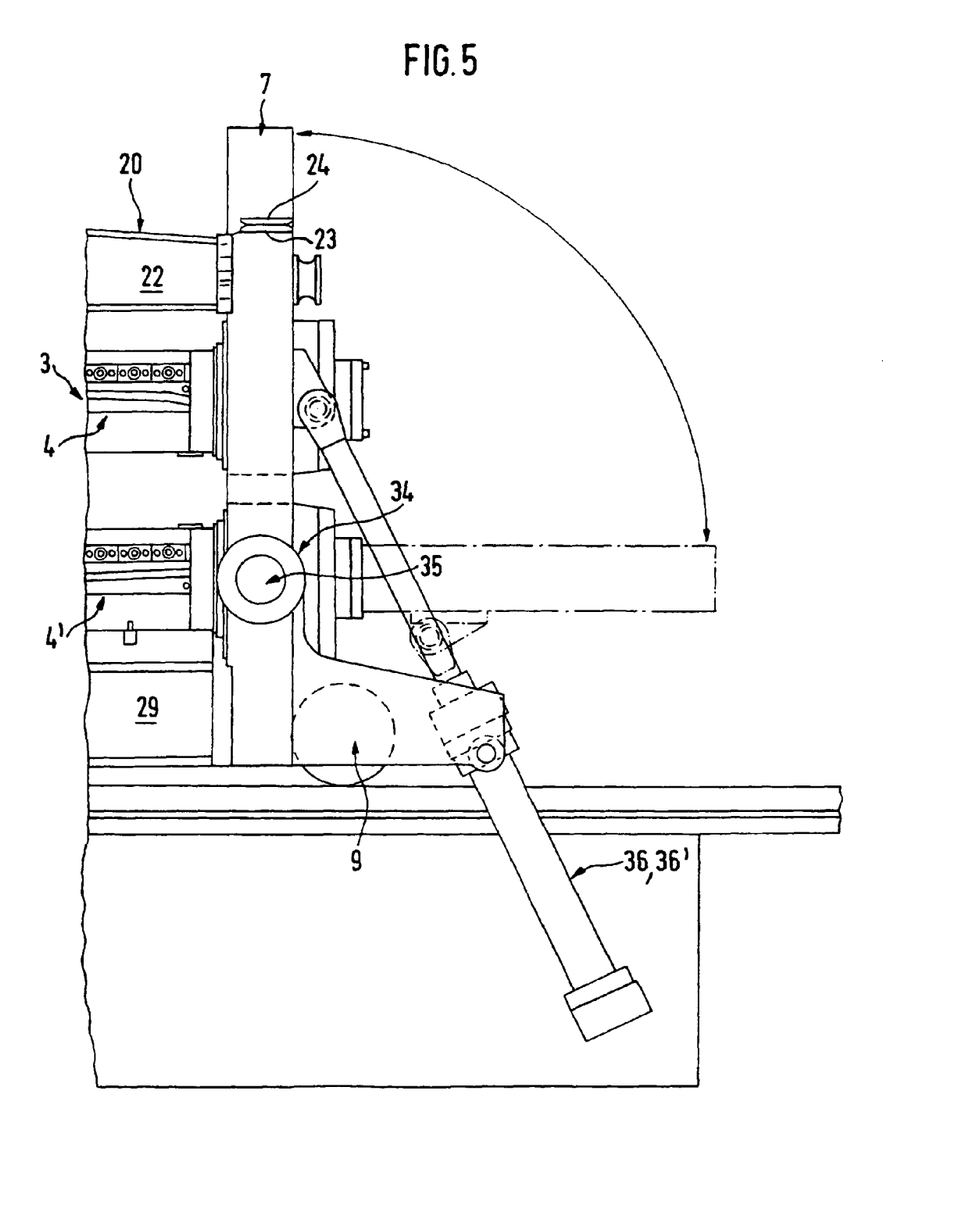
FIG. 5 is a side view the front part of the shears device with a foldable clamping element.
Figure 6:
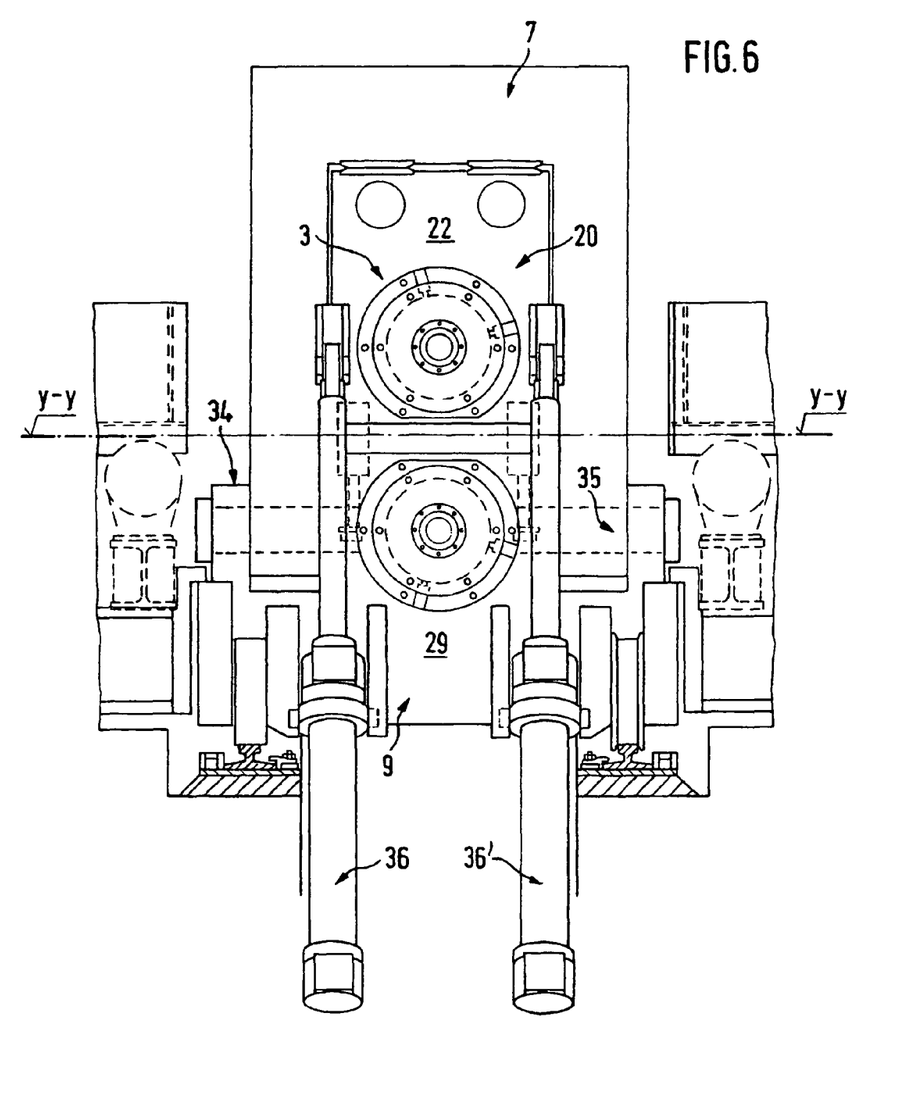
FIG. 6 is a front view the shears device with the foldable clamping element according to FIG. 5.

A further alternative configuration of the connection at the open side of the frame 20 is illustrated in FIGS. 5 and 6. In this embodiment, the clamping element 7 is arranged transversely to the horizontal arms 22, 29 of the machine frame 20 and is formed with a joint 34 having pivot axis 35 extending parallel to the rolling line. With the aid of the force means 36, 36', the clamping element 7 is folded upwardly for coupling the two frame arms 22, 29 together and is folded downwardly for canceling the coupling position (shown in dashed lines). The clamping element 7, which can be folded up or down, as well as the coordinated force means 36, 36' are arranged on the drive carriage 9. In this configuration, the lower pressure plates 23, 23' of the holding elements 6, 6' in the closed position interact with the glide plates 24, 24' of the clamping element 7 that can be moved on top of the pressure plates and this results in a positive as well as non-positive connection of the two arms 22 and 29 of the machine frame 20.

The different configurations show flying or stationary shears for cutting strips or sheet metal to length, which shears can be moved in and out of the rolling line or the rolling table while the strip 1 or the sheet metal is moved in the line x-x on the rolling table 2 in the rolling table direction or is standing still. Because the shears are moved in only directly before the cut, the rolling table remains open in the upward direction and can remain freely accessible after mounting of the shears. The shears can be serviced outside of the line and, in the case of a disruption, can be moved quickly out of the line.

LIST OF REFERENCE NUMERALS

1 strip/sheet metal
2 rolling table
2' movable part
3 shears
4, 4' blade holder
5, 5' holding element
6, 6' holding element
7 clamping element
8 drive apparatus 8' reducing gear
9 drive carriage
10 drive
11 force means/actuating member
12 synchronization gear
13, 13' wheel flanges
14, 14' guide rails
20 machine frame
21 coupling elements
22 upper frame arm
23, 23' pressure plates
24, 24' gliding plates
25, 25' force means/actuating members
26, 26' gliding plates
27, 27' recess
28, 28' coupling sockets
29 lower frame arm
30 force means/actuating member
31, 31' spindle drive
32, 32' coupling rod
34 joint
35 pivot axis
36, 36' force means/actuating members
37, 37' pressure plates
38 gliding path

The invention claimed is:

1. A shears device, comprising:
a rolling table having a movable part;
a rail-guided drive carriage coupled with the movable part of the rolling table;
a U-shaped frame incorporating a vertical base and two horizontal arms that make the frame U-shaped, the arms having first and second sides, the first sides of the arms being connected to the vertical base, the U-shaped frame being mounted on the drive carriage;
a transport line extending through the horizontal arms;
shears;
a drive apparatus arranged on the drive carriage for driving the shears;
the shears arranged on the U-shaped frame, the first side of the arms being adjacent the drive apparatus and the second side of the arms being opposite the first side;
holding elements provided on the first side and the second side of the arms;
blade holders supported by the holding elements, the shears being supported by the blade holders, wherein one of the holding elements on the second side of an upper of the horizontal arms has at least one pressure plate;
a drive for moving the drive carriage transverse to the transport line while a work piece is positioned in the transport line;
a clamping element arranged adjacent the second side of the arms, the clamping element having congruent gliding plates that overlap the at least one pressure plate; and wherein the clamping element together with the gliding plates is movable along a horizontal path across the at least one pressure plate so that the clamping element and the one of the holding elements are coupled.

2. A shears device, comprising:
a rolling table having a movable part;
a rail-guided drive carriage coupled with the movable part of the rolling table;
a U-shaped frame incorporating a vertical base and two horizontal arms that make the frame U-shaped, the arms having first and second sides, the first sides of the arms being connected to the vertical base, the U-shaped frame being mounted on the drive carriage;
a transport line extending through the horizontal arms;
shears;
a drive apparatus arranged on the drive carriage for driving the shears;
the shears arranged on the U-shaped frame, first side of the arms being adjacent the drive apparatus and the second side of the arms being opposite the first side;
holding elements provided on the first side and the second side of the arms;
blade holders supported by the holding elements, the shears being supported by the blade holders, wherein one of the holding elements on the second side of an upper of the horizontal arms has threaded spindle coupling rods connected so as to be pivotable to both the first side and the second side of the arms, the coupling rods are pivotable through recesses in the drive carriage so as to engage in congruent coupling sockets of a lower of the horizontal arms or in congruent coupling sockets of the one of the holding elements on the upper of the arms;
a drive for moving the drive carriage transverse to the transport line while a work piece is positioned in the transport line; and
a means for pivoting the coupling rods into contact with one of said coupling sockets.

3. The shears device according to claim 2, wherein the contact between the rods and the sockets is form-fit/frictional contact.

4. A shears device, comprising:
a rolling table having a movable part;
a rail-guided drive carriage coupled with the movable part of the rolling table;
a U-shaped frame incorporating a vertical base and two horizontal arms that make the frame U-shaped, the arms having first and second sides, the first sides of the arms being connected to the vertical base, the U-shaped frame being mounted on the drive carriage;
a transport line extending through the horizontal arms;
shears;
a drive apparatus arranged on the drive carriage for driving the shears;
the shears arranged on the U-shaped frame, the first side of the arms being adjacent the drive apparatus and the second side of the arms being opposite the first side;
holding elements provided on the first side and the second side of the arms;
blade holders supported by the holding elements, the shears being supported by the blade holders;
a drive for moving the drive carriage transverse to the transport line while a work piece is positioned in the transport line;
a clamping element correlated transversely to the two horizontal frame arms, the clamping element is configured to pivot about a pivot joint, wherein the pivot axis of the pivot joint extends parallel to the transport line; and
a means for pivoting the clamping element between a position wherein the clamping element couples the two horizontal arms and a position wherein the coupling element does not couple the two horizontal arms.

* * * * *